July 23, 1968　　　R. E. REICHARD　　　3,393,511
FLUID PRESSURE CONTROL DEVICE
Filed Sept. 26, 1966
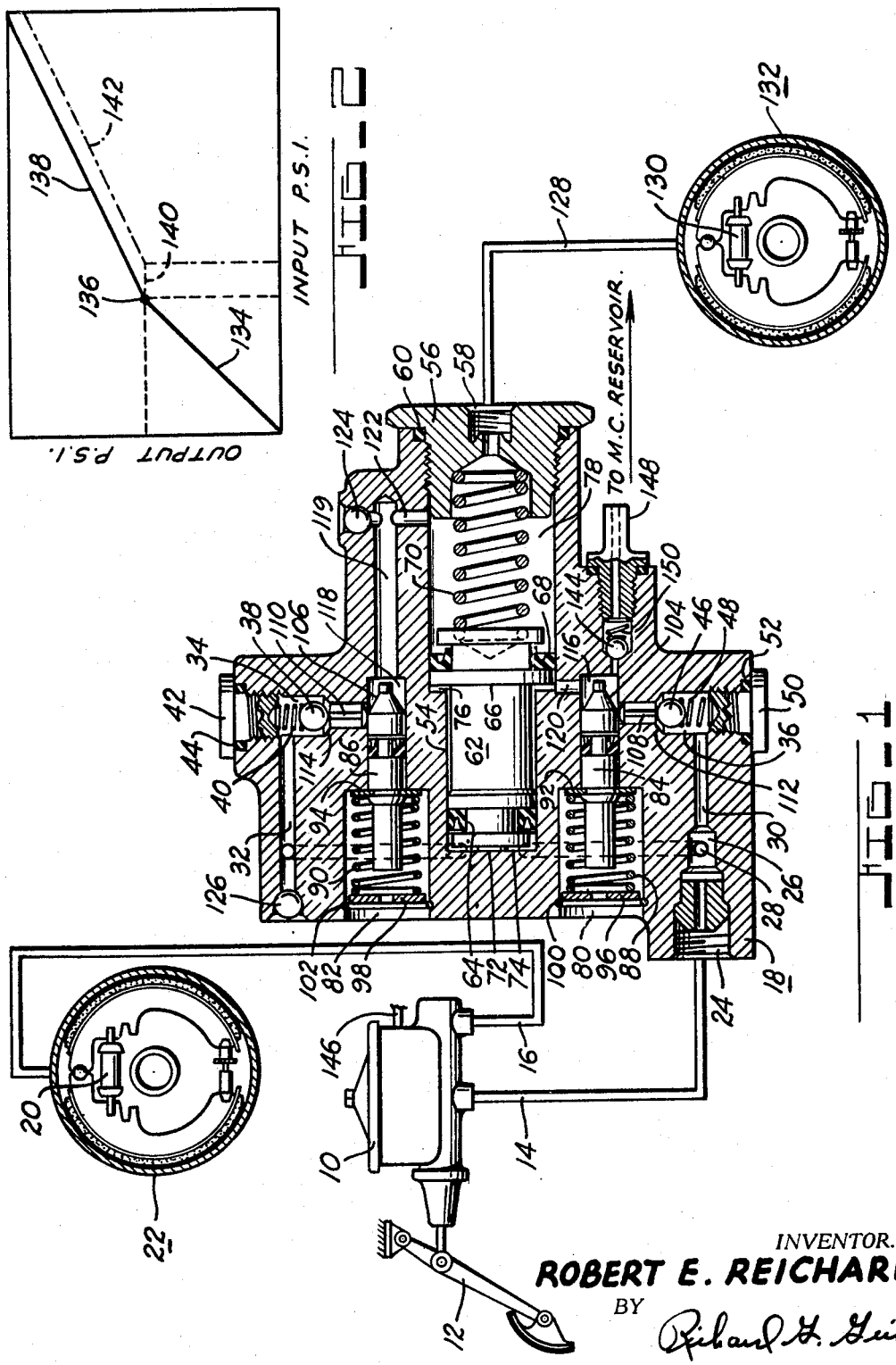
INVENTOR.
ROBERT E. REICHARD.
BY
*Richard G. Geib*
ATTORNEY.

United States Patent Office 3,393,511
Patented July 23, 1968

3,393,511
FLUID PRESSURE CONTROL DEVICE
Robert E. Reichard, South Bend, Ind., assignor to The Bendix Corporation, a corporation of Delaware
Filed Sept. 26, 1966, Ser. No. 582,133
12 Claims. (Cl. 60—54.5)

This invention relates to a device for varying the output pressure of a pressure regulator valve in accordance with a predetermined proportion of input pressure above a preselected value.

This invention may find particular application in vehicle braking systems where it is desirable to vary the pressuration of front and rear brake cylinders because of the varied loading carried by the associated wheels of the vehicle. It should be noted, however, that the invention is not to be limited to this particular applictaion as it would be equally applicable to any fluid pressure system where it is desired to have a proportionally lower output pressure with respect to an input pressure supplied by a pump or the like.

It is a principal object of the invention, therefore, to provide a device which is capable of reproportioning the relative pressurization of a fluid to be delivered to an actuator with regard to a fluid supplied from a pressure source.

It is still another object of this invention to provide a means for proportioning a fluid pressure output with respect to a fluid pressure supply which incorporates provisions to control the change over from straight fluid supply through the device to a proportioning supply from the device.

It is a particularly detailed object of this invention to provide a hydraulic pressure proportioning device in a vehicle braking system incorporating a split master cylinder so as to at first supply fluid from the master cylinder to a wheel cylinder for the vehicle braking system at a pressure equal to that being supplied to the device and above a predetermined pressure, immediately change over to a proportioned value with respect to the input pressure.

Other objects and advantages of this invention will appear from the description of the drawings in which:

FIGURE 1 is a schematic diagram of a vehicle braking system showing a proportioning device in accordance with my invention in cross section; and FIGURE 2 is a graphical illustration of an input to output pressure relationship which may be experienced with the utilization of this invention.

With regard now to FIGURE 1 there is shown a master cylinder 10 that is operated by a brake pedal 12 for supplying independent pressures to conduits 14 and 16. As seen, the conduit 14 is communicated with a pressure regulating valve 18, and the conduit 16 is directly communicated with a wheel cylinder 20 of a vehicle front brake mechanism 22.

The conduit 14 is communicated to an inlet 24 in the regulating device 18 wherefrom it is communicated to a chamber 26 that is open to passages 28 and 30. These passages, as also other passages to be later described, are preferably formed with the casting of the regulating device 18. The passage 28 passes around the side of the housing and opens into an axial passage 32 which leads to a valve chamber 34. The passage 30, on the other hand, opens directly into a valve chamber 36.

Within the valve chamber 34 a ball valve 38 is biased by a spring 40 interposed between a plug 42 and the ball valve 38. The plug 42 is screw threaded into the housing and a seal 44 is provided about the opening of the housing receiving the plug 42 to maintain the integrity of the passages and the chamber 34. Similarly, a ball valve 46 is biased by a spring 48 interposed between a plug 50, also screw threaded to the housing of the regulating device 18 with a seal 52 interposed.

The housing for the regulating device 18 is counterbored to provide a stepped chamber 54, and a plug 56 having an outlet port 58 is screw threaded into the open end with a seal 60 interposed to close the stepped chamber. At the time of mating the plug 56 to the housing, a stepped piston 62 having a rear face formed by a cup seal 64, an intermediate face 66 and a front face provided by a cup seal 68 is inserted with spring 70 installed in a preloaded condition. Upon the assembly of the plug 56 to the housing, the piston 62 is biased to a position where a rear projection 72 abuts the rear wall of the stepped chamber. In such attitude there is formed a rear variable volume chamber 74, an intermediate variable volume chamber 76 and a forward variable volume chamber 78 in the bore. Under most conditions the cup seals 64 and 68 maintain the integrity of the intermediate chamber 76 in that equal pressure is exposed to both sides of the lips of the cup seals or in the most extreme case a greater pressure is exposed to the side of the cup seals 64 and 68 facing the rear and front chambers causing the expansion and sealing engagement of the lips thereof with the stepped chamber walls.

The housing for the pressure regulator is also counterbored as at 80 and 82, and pistons 84 and 86 are slidably arranged in the counterbores and positioned by springs 88 and 90 held by spring retainers 92 and 94 resting upon a shoulder of the housing and the rear spring retainers 96 and 98 held to the housing by snap rings 100 and 102. The pistons are contoured on their forward face, as at 104 and 106 to slidably operate links 108 and 110, which in the released attitude shown, hold the ball valves 38 and 46 off seats 112 and 114 provided in the housing in the valve chambers 36 and 34, respectively. The links 108 and 110 are machined to have passages that will communicate the valve chambers 36 and 34 to the forward portions 116 and 118 of the counterbores 80 and 82, respectively. These forward portions 116 and 118 are open by means of passages 119 and 120 to the intermediate chamber 76 and the forward chamber 78, respectively. It should be noted that in order to open the passage 119 to the chamber 78 a cross drilled passage 122 is provided into the stepped chamber adjacent the plug 56 having the outlet port 58, and a ball 124 is press fitted into the cross drilled passage 122 to seal the same after it has been machined. The passage 32 may be formed in the same manner with a press fitted ball 126 sealing it after the machining operation. The outlet port 58 is connected to a conduit 128 which leads to a wheel cylinder 130 of a rear brake mechanism 132.

In operation, the operator of a vehicle depresses the brake pedal 12 to create independent pressures in conduits 14 and 16. The pressure from conduit 14 enters the pressure regulating valve 18 at the inlet 24. It passes by means of the passages 28 and 119 via the valve chamber 34 to the rear variable volume chamber 74, and the front variable volume chamber 78 and out the outlet 58 to the conduit 128. Simultaneously, this fluid pressure is being introduced to the valve chamber 36 and to the passage 120 and the intermediate chamber 76. It should therefore be quite apparent that at the initial stage of operation both the wheel cylinders 20 and 130 are being actuated by the master cylinder 10 to provide a relationship shown by the line 134 in the graph of FIGURE 2.

As this pressure is increasing to a value whereby the springs 88 and 90 may be overcome, which is represented by the point 136 in the graph of FIGURE 2, the pistons 104 and 106 are urged to the left to allow the links 108 and 110 to seat the balls 46 and 38 on the seats 112 and 114, respectively. At this point the inlet pressure at the inlet 24 is cut off from the front variable volume chambers 78, and the intermediate chamber 76. However, the pressure in the intermediate chamber 76 reacts upon the annular surface 66 of the stepped piston 62 to, in addition to the area provided by the cup seal 64 on the rear face of the piston 62, immediately start translation of the piston to decrease the volume of the variable volume chamber 78 and continue delivery of pressurized fluid to the outlet 58 and the rear wheel brake mechanism 132. The relationship of this delivery of output pressure to the input pressure is shown by the line 138 in FIGURE 2. It should be noted at this juncture that prior art structures which do not utilize the intermediate chamber 76 would, before delivering pressurized fluid to the conduit 128, have a flat spot shown by the dotted line 140 and thereafter show the pressure continuing on a parallel slope shown by the dotted lines 142 with regard to the line 138. The flat in the curve for the prior art structures is mainly due to the need for creating sufficient pressure differential across the smaller area of the piston 62 with respect to the larger area before it may be moved in the chamber 78.

Upon release of the brake pedal 12 or with any reduction of foot pressure on the pedal, the piston 62 will be returned to the position shown in the drawing. During the return the pressure will build up in the chamber 76. In order to prevent this pressure in chamber 76 from holding the piston 62, a pressure relief valve 144 is provided in the housing 18. This valve is connected to a master cylinder reservoir port 146 by a hose or the like between this port and the valve's outlet fitting 148. The valve is biased on a seat in the housing around a passage to chamber 116 by a spring 150. This spring 150 is set to hold the ball on the seat until the pressure in 116 exceeds, but slightly, the predetermined pressure which operates piston 84. Thus, the return flow from the brakes will be slightly spaced from and parallel to the slope of line 138 until it intersects the line 134 extended, and thereafter it will momentarily be delayed before joining with line 134 for a complete release of pressure within the braking system and the reactivation of valves 38 and 46 by the springs 90 and 88 returning pistons 86 and 84.

As may be readily apparent to those skilled in the art to which this invention relates, the objects and advantages enumerated above as well as those which will be readily apparent to such persons have been accomplished by the structure set forth above. It is now desired to set forth the scope of protection to be afforded by these Letters Patent in the appended claims.

I claim:
1. A fluid pressure control device comprising:
   a housing having an inlet opening, an outlet opening, a stepped bore, a passage means communicating said inlet to said stepped bore which is communicated to said outlet opening, said housing having a first bore between a portion of said stepped bore and said inlet in said passage means, and a second bore between another portion of said stepped bore and said inlet also in said passage means;
   a stepped piston within said stepped bore dividing said stepped bore into first, second and third variable volume chambers, respectively, communicated to said inlet and said first bore, said second bore, and said first bore and said outlet, said stepped piston being positioned in said stepped bore by a resilient means;
   a first piston in said first bore;
   a second piston in said second bore;
   a first valve in said passage means between said inlet and said first bore, said valve being operably connected to said first piston for controlling fluid communication from said first variable volume chamber to said third variable volume chamber; and
   a second valve in said passage means between said inlet and said second bore, said second valve being operably connected to said second piston for controlling fluid communication from said inlet to said second variable volume chamber.

2. A fluid pressure control device according to claim 1 wherein said stepped piston is characterized as having a first face in said first variable volume chamber and a second face in said second variable volume chamber with the combined effective area of said first face and said second face substantially equalling the effective area of a third face for said piston in said third variable volume chamber.

3. A fluid pressure control device according to claim 1 wherein said first and second pistons are biased against outlet pressure and inlet pressure, respectively, by a spring means to terminate inlet flow via said passage means to said first bore and said second bore whenever inlet pressure and outlet pressure overcome said spring means.

4. A pressure control device including in combination:
   a housing having an inlet opening, a stepped chamber, an outlet opening from said stepped chamber, a first bore, a first passage communicating said inlet opening to said stepped chamber and said first bore, a second passage communicating said first bore to said stepped chamber adjacent said outlet opening, a second bore, a third passage communicating said inlet opening to said second bore, and a fourth passage communicating said second bore to said stepped chamber;
   a first pressure responsive valve means having a first piston in said first bore operatively connected to a first valve in said first passage for controlling fluid communication therefrom to said second passage;
   a second pressure responsive valve means having a second piston in said second bore operatively connected to a second valve in said third passage for controlling fluid communication therefrom to said fourth passage; and
   a stepped piston in said stepped chamber dividing said chamber into an inlet variable volume chamber open to said first passage, an intermediate variable volume chamber open to said fourth passage and an outlet variable volume chamber open to both said second passage and said outlet opening.

5. A pressure control device according to claim 4 wherein said operative connection between said first and second pistons and said first and second valves includes links each having a surface abutting a contoured surface of each of said first and second pistons.

6. A pressure control device according to claim 5 and further including means to normally position each of said first and second pistons so that said links maintain said first and second valves in an open position, said means being arranged to be in opposition to fluid pressure in said first and second bores respectively.

7. A pressure control device according to claim 4 wherein said stepped piston has first, second and third faces proportioned so that fluid pressure in said inlet variable volume chamber on said first face and fluid pressure in said intermediate variable volume chamber so long as said first and second pressure responsive valve means is inactive will be acting on a combined area substantially equal to an area of a third face on said piston in said third variable volume chamber.

8. A pressure control device according to claim 7 wherein said first pressure responsive valve means and said second pressure responsive valve means further include spring means arranged in opposition to a fluid pressure at said inlet opening to close said first and second valves whenever inlet and outlet pressures overcome said spring means to maintain a constant pressure on said second face to aid the inlet pressure on said first face to pressurize said outlet variable volume chamber as fluid communication to said second passage is terminated.

9. A pressure control device according to claim 8 and further including a spring operatively connecting said stepped piston and said housing to position said stepped piston in said stepped chamber and oppose any fluid pressure differential across said piston acting in a direction to decrease the volume of said outlet variable volume chamber.

10. A pressure control device according to claim 4 wherein said first and second bores are provided with counterbores in which spring means are operatively connected to said first and second pistons to oppose and limit travel of said first and second pistons.

11. A method of regulating pressure delivery comprising the following steps:
supplying a fluid pressure to a regulating valve;
introducing said fluid pressure to valve means to first, second and third variable volume chambers and thence to an outlet port;
closing said valve means to terminate fluid flow from said first variable volume chamber through said third variable volume chamber to said outlet port and to trap a constant pressure in said second variable volume chamber;
translating a movable wall with a pressure in said first variable volume chamber of greater magnitude than that being produced by such translation in said third variable volume chamber while utilizing said constant pressure in said second variable to assist said translation by substantially eliminating delay in providing sufficient pressure differential to translate said piston; and
replenishing said constant pressure as said movable wall is translated.

12. A method of regulating pressure delivery according to claim 11 and further comprising the step of returning said movable wall and valve means to a position which permits reapplication of said device whenever the pressure is released and there is return of fluid pressure from said regulating valve.

References Cited

UNITED STATES PATENTS 2,899,024   8/1959   Hamilton et al. ___ 60—54.5 XR

MARTIN P. SCHWADRON, *Primary Examiner.*

ROBERT R. BUNEVICH, *Examiner.*